US007908724B2

(12) United States Patent
Isabelle

(10) Patent No.: US 7,908,724 B2
(45) Date of Patent: Mar. 22, 2011

(54) REVERSE OSMOSIS MEMBRANE EXTRACTOR

(76) Inventor: Richard E. Isabelle, Ford, VA (US)

( * ) Notice: Subject to any disclaimer, the term of this patent is extended or adjusted under 35 U.S.C. 154(b) by 960 days.

(21) Appl. No.: 11/757,424

(22) Filed: Jun. 4, 2007

(65) Prior Publication Data

US 2008/0295648 A1 Dec. 4, 2008

(51) Int. Cl.
*B23P 19/04* (2006.01)

(52) U.S. Cl. ............................ 29/260; 29/256; 210/636

(58) Field of Classification Search .................... 29/244, 29/263, 261, 259, 260, 251, 252, 267, 272; 411/383; 198/666, 667, 668; 81/52; 100/290, 100/289; 254/131; 269/130; *B65G 33/26*
See application file for complete search history.

(56) References Cited

U.S. PATENT DOCUMENTS 2,977,995 A * 4/1961 Walpole .......................... 138/99
5,379,330 A 1/1995 Lovell et al.
6,418,600 B1 * 7/2002 Benoit ............................ 29/263
6,521,124 B2 2/2003 Northcut et al.
6,581,261 B1 * 6/2003 Chen .............................. 29/252

* cited by examiner

*Primary Examiner* — Lee D Wilson
*Assistant Examiner* — Jamal Daniel
(74) *Attorney, Agent, or Firm* — Louis Ventre, Jr.

(57) ABSTRACT

A tool for removal of a reverse osmosis membrane from a high-pressure vessel (150) includes a plunger (105) fitting within the high-pressure vessel (150); a clamp to secure the tool to the outside of the high-pressure vessel (150); a drive hub (135) secured to the clamp such that an internally threaded passageway (405) in the hub is parallel with the longitudinal axis of the high-pressure vessel (150); and a drive rod (115) threaded to advance within the drive hub (135) through the threaded passageway (405) and push the plunger (105) along the longitudinal axis of the high-pressure vessel (150). Preferred embodiments include a bearing plate (110) affixed to the plunger (105) to spread the load from the drive rod (115) and one or more extension rods (125) to extend the length of the drive rod (115).

9 Claims, 4 Drawing Sheets

REVERSE OSMOSIS MEMBRANE EXTRACTOR

FIELD OF INVENTION

In the field of liquid purification, a tool is disclosed for removing a reverse osmosis membrane installed within a high-pressure vessel.

BACKGROUND OF THE INVENTION

Reverse osmosis facilities typically employ an array of high-pressure vessels, each in the form of a right circular cylindrical pipe up to about 20 feet in length. Each high-pressure vessel holds one or more membranes, depending on the length of the pressure vessel and membrane.

Membranes are made in a several configurations, with the two most common configurations being spiral-wound and a hollow-fiber. In effect, a typical membrane might be described as a cylindrical cartridge analogous to a roll of toilet paper.

The membrane essentially fills the high-pressure vessel and periodically must be removed for cleaning or replacement.

DESCRIPTION OF PRIOR ART

Removal of membranes from reverse osmosis high-pressure vessels is typically a manual task involving removal of end caps on the high-pressure vessels and manually pushing the membrane out of the high-pressure vessel. No special tools are needed and many simply use a two-by four or similar push rod to engage the end of the membrane and push it out.

There are three significant problems experienced in reverse osmosis industry that the present invention solves: The first is that membranes often expand during use and tightly engage the inside surface of the high-pressure vessel. As a consequence, it takes great physical effort to dislodge the membrane and push it out. The present invention enables the application of force amplified by the leverage of a tool. It further enables use of electrical power, compressed air, and manual force, expanding the potential for labor saving operability.

The second problem experienced with current technology is that the force needed to push out a membrane often damages the membrane. This often results in a messy repair job that forces the user to discard and replace a clogged membrane with a new membrane, rather than cleaning and reinstalling it. The present invention applies the necessary removal force over substantially the full surface area at the end of the membrane, thus, minimizing the potential for damage to the membrane. By pushing the membrane out of the high-pressure vessel with a minimum of damage, the present invention maximizes the potential for cleaning the membrane and re-installing it, deferring replacement costs, minimizing the mess of maintenance, and postponing membrane disposal costs.

A typical industrial reverse osmosis system contains 6 filters, each one 40 inches long, which are connected to each other by an inter-connector. As the filters are pushed out the outlet end of the high-pressure vessel, they can be separated. Therefore, about 4 or 5 feet is required at the outlet end.

The third problem experienced with current technology is that removal of membranes may require access space at the front and rear of the high-pressure vessel in order to make space for a long enough pole to push out the membrane. High-pressure vessels may be as long as about 20 feet, therefore necessitating as much as 45 feet of space for the high-pressure vessel (20 feet in front, 20 feet for the membrane and 5 feet at the rear). Many times other equipment blocks the front end of the high-pressure vessel forcing removal of this equipment to gain access to the space needed at the front of the high-pressure vessel. Even when this access space is provided for in advance, it requires extra facility cost to allocate such access space at the front end of the high-pressure vessel. An embodiment of the present invention employs extension rods that may be added to the tool at the front end to minimize front end access space and increase the reach of the tool to the full length of a high-pressure vessel. This embodiment thus avoids the problem of having to move equipment or allocate access space at the front end in reverse osmosis facilities.

Accordingly, the present invention will serve to improve the state of the art by providing a tool that enables easy application of the force needed to dislodge a membrane from a high-pressure vessel. Additionally, the present invention minimizes the potential for damage to a membrane in the removal process. And finally, the present invention minimizes the access space needed to engage the tool in the membrane removal process.

BRIEF SUMMARY OF THE INVENTION

The reverse osmosis membrane extractor includes a plunger of circular cross-section having a diameter less than that of the inside diameter of a high-pressure vessel in which a reverse osmosis membrane is installed. It next includes a clamp to secure the tool to the outside of the high-pressure vessel. It next includes a drive hub secured to the clamp such that an internally threaded passageway in the hub is parallel with the longitudinal axis of the high-pressure vessel. And lastly, it includes a drive rod threaded to advance within the drive hub through the threaded passageway and push the plunger along the longitudinal axis of the high-pressure vessel, thus pushing the membrane out of the high-pressure vessel. Preferred embodiments include a bearing plate affixed to the plunger to spread the load from the drive rod and extension rods to extend the length of the drive rod.

BRIEF DESCRIPTION OF THE DRAWINGS

Referring now to the drawings in which like reference numbers represent corresponding parts throughout.

DETAILED DESCRIPTION

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made without departing from the scope of the present invention.

The preferred embodiment of the tool for removal of a reverse osmosis membrane from a high-pressure vessel has the following components: (a) a plunger of circular cross-section having a diameter less than that of the inside diameter of the high-pressure vessel; (b) a clamp to secure the tool to the outside of the high-pressure vessel; (c) a drive hub secured to the clamp such that an internally-threaded passageway in the hub is parallel with the longitudinal axis of the high-pressure vessel; and, (d) a drive rod threaded to advance within the drive hub through the threaded passageway and push the plunger along the longitudinal axis of the high-pressure vessel.

Figure 1:
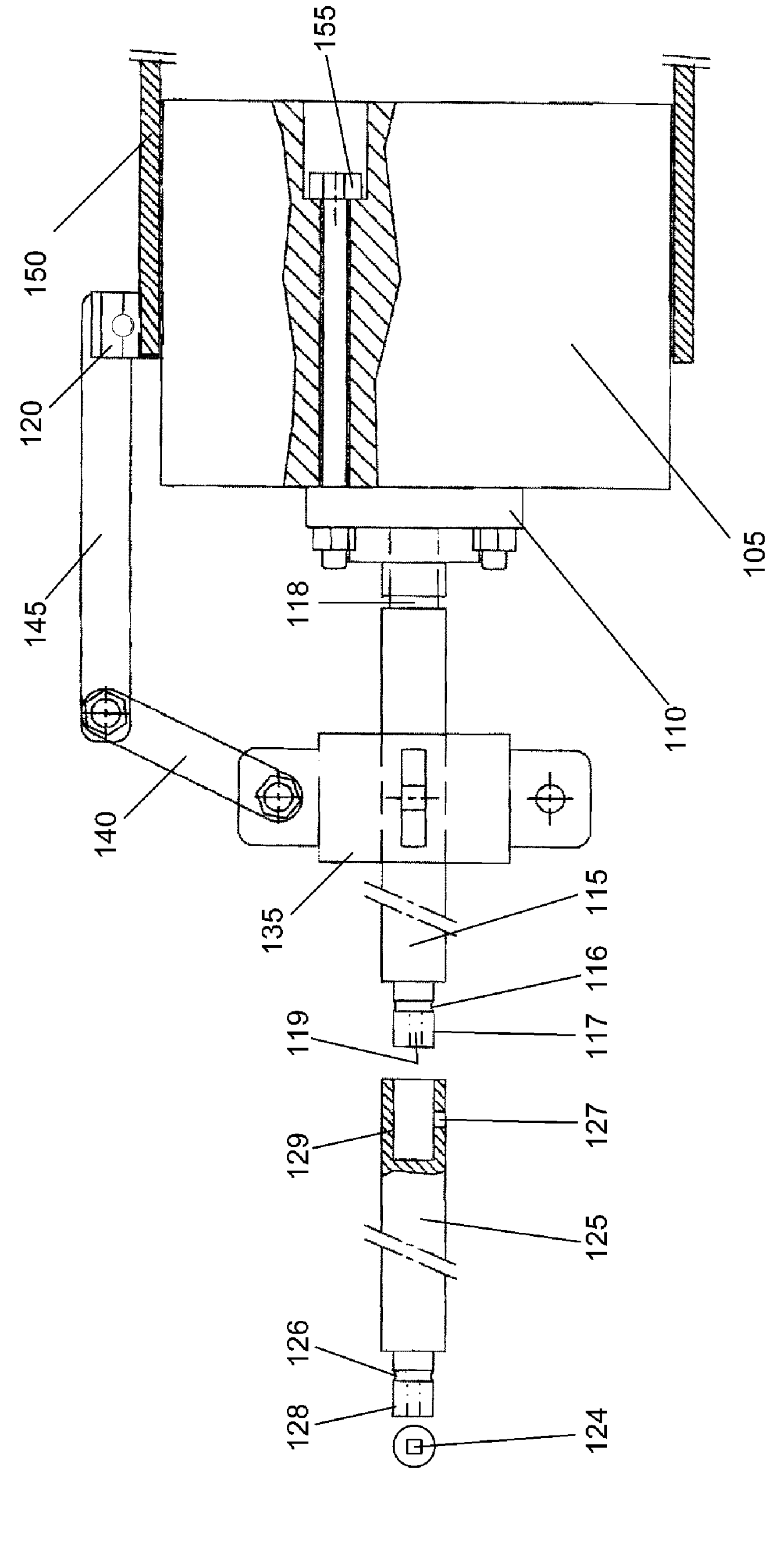
FIG. 1 is a side view of a preferred embodiment of the tool.

FIG. 1 is a side view of a preferred embodiment of the tool in the context of a high-pressure vessel (150) in cross-section.

A plunger(105) of circular cross-section is shown within the high-pressure vessel (150). The plunger (105) has a diameter less than that of the inside diameter of the high-pressure vessel (150) in order to fit within the high-pressure vessel (150), but preferably extends to the inside wall of the high-pressure vessel (150). The plunger (105) is approximately the same outside diameter as the inside diameter high-pressure vessel (150). Typical diameters range from about 7.9 to 8.2 inches. The plunger (105) may be any convenient thickness and is about 4 inches thick in a preferred embodiment. It is preferable made of nylon or polyethylene.

Figure 5:
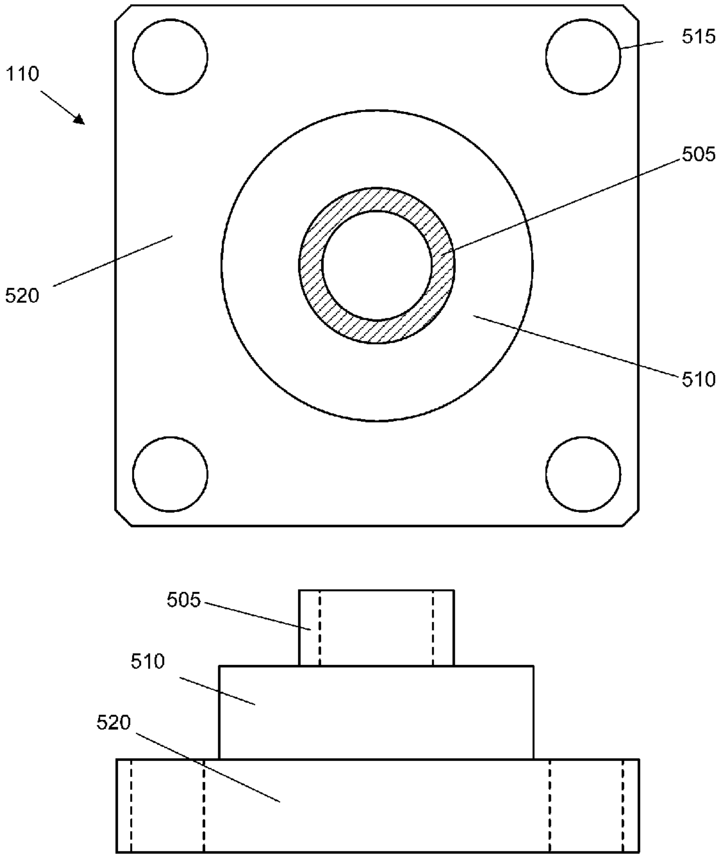
FIG. 5 is a front and elevation view of the bearing component in a preferred embodiment of the tool.

The plunger (105) may be secured to the tool by any means known in the art, and is shown in FIG. 1 as secured to the tool by a bolt (155) and nut. In this embodiment, the plunger (105) is bolted to an optional bearing plate (110) on the outward face of the plunger. Four such bolts and nuts are preferable as indicated by the four holes (515) in the bearing plate shown in FIG. 5.

The bearing plate (110) distributes the load from the drive rod that pushes the plunger and the membrane. The bearing plate (110) shown as an example is essentially a rectangular base plate (520) with four holes (515) for use with the bolt (155) and nut to secure the plunger (105) to the tool. A secondary plate (510) of circular cross-section is welded to the base plate (520) and a pipe segment (505) is welded to the secondary plate (510). The pipe segment (505) is a receiving port for the end of the drive rod that prevents lateral movement of the drive rod away from the longitudinal axis of the high-pressure vessel (150) during operation. The bearing plate (110) may be any convenient size and is preferably about 4 inches square and 2 inches in overall height.

Figure 2:
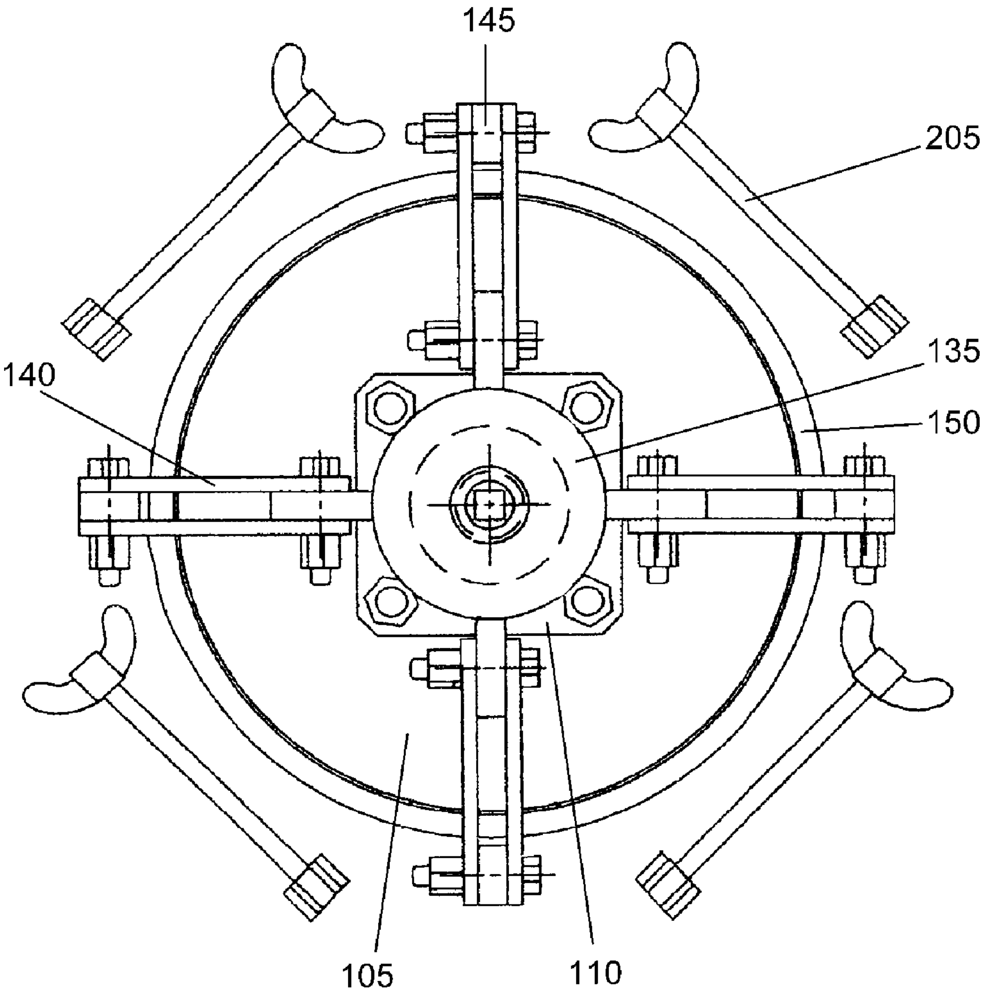
FIG. 2 is an end view of a preferred embodiment of the main components of the tool in the context of a high-pressure vessel.
Figure 3:
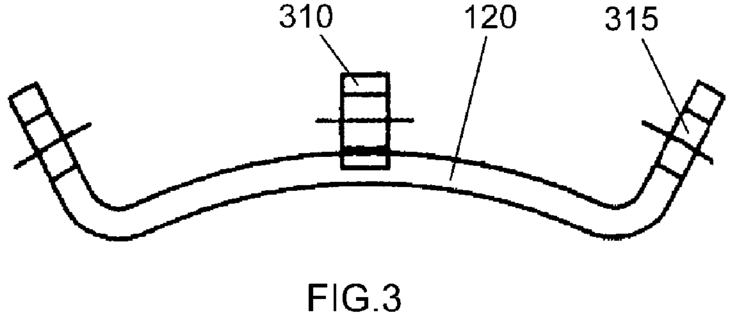
FIG. 3 is a side view of a clamping component for attaching a preferred embodiment of the tool to the high-pressure vessel.

A preferred embodiment uses a clamp, fabricated from an assembly of parts shown in FIGS. 1, 2 and 3. Any clamping device that can secure the tool to the outside of the high-pressure vessel may be used. For example, pipe clamps are well known in the art.

In a preferred embodiment, shown in the FIGS. 1, 2 and 3, the clamp comprises a plurality of arcuate spring-like attachments (120), preferably four arcuate spring-like attachments, and a plurality of nuts and bolts (205), preferably four nuts and bolts. Each arcuate spring-like attachment (120) has a bolt hole (315) at each end to permit the arcuate spring-like attachments to be joined together and tightened around the circumference of the high-pressure vessel (150) by the nuts and bolts (205) and further each arcuate spring-like attachment (120) has a connection fixture (310) for a clamp arm (145) leading to the drive hub (135).

A preferred embodiment includes a drive hub (135) secured to the clamp such that an internally-threaded passageway (405) in the hub is parallel with the longitudinal axis of the high-pressure vessel. At least one drive-hub arm (140), and preferably two drive-hub arms as shown in FIG. 2, links each clamp arm (145) and the drive hub (135) to secure the drive hub (135) to the clamp. The internally-threaded passageway (405) may be any suitable diameter and is preferably about 1 inch in diameter.

Figure 4:
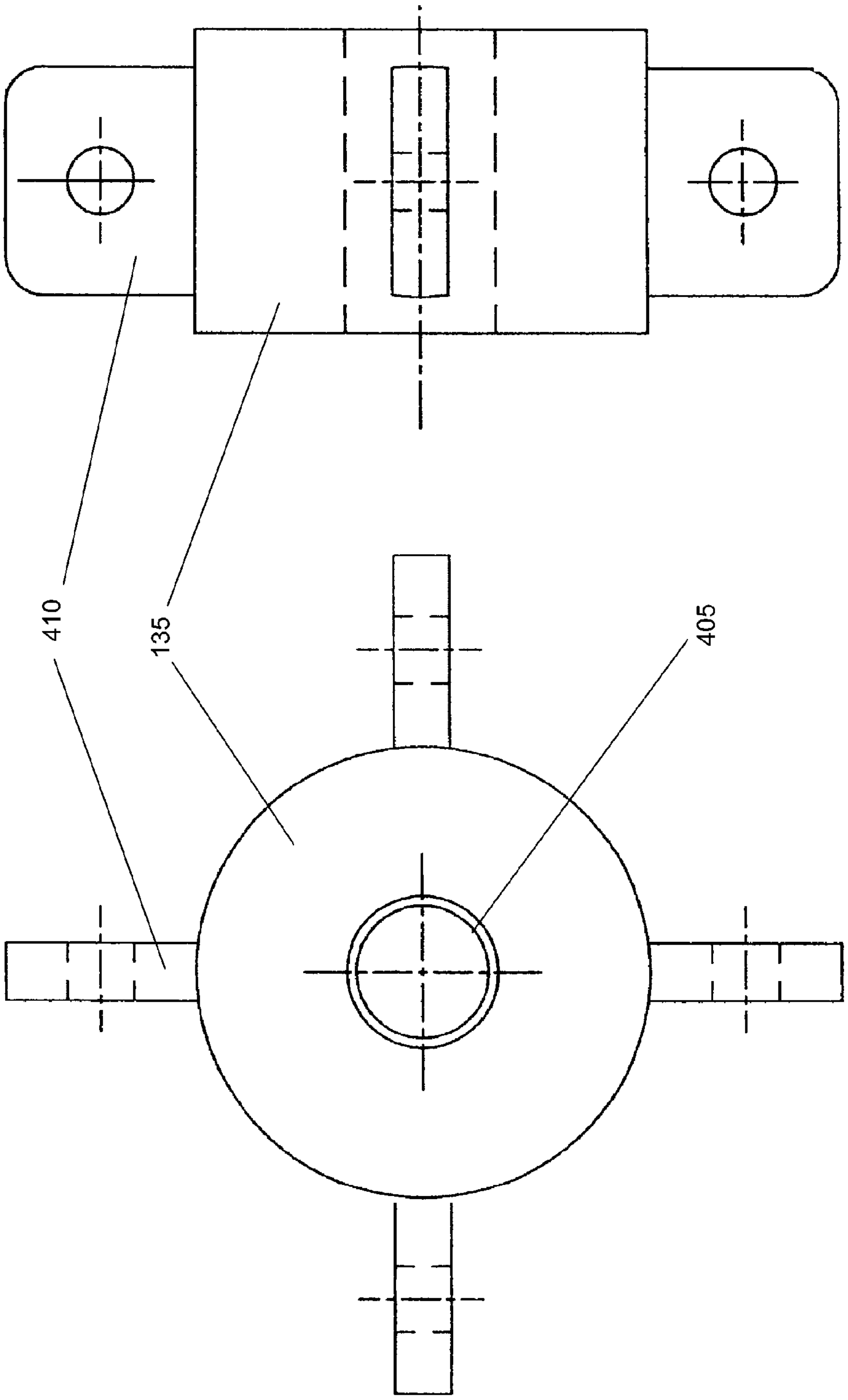
FIG. 4 is a front and side view of the drive hub in a preferred embodiment of the tool.

A front and side view of the drive hub (135) is shown in FIG.4. In this embodiment, there are four extensions (410) on a central body of circular cross section comprising the drive hub (135). Each of the four clamp arms (145) attaches to the each of the extensions (410) with a nut and bolt. This arrangement locks the drive hub (135) along the longitudinal axis of the high-pressure vessel (150). This arrangement allows the drive rod to be threaded through the internally-threaded passageway (405) and engage the bearing plate (110) in the pipe segment (505). The drive hub (135) may be any convenient configuration. The central body is preferably about 8 inches in diameter and each of the extensions (410) is preferably a ⅜ inch steel plate welded to the central body and extending about 1 inch from the central body.

A preferred embodiment includes a drive rod (115) threaded to advance within the drive hub (135) through the threaded passageway (405) and push the plunger (105) along the longitudinal axis of the high-pressure vessel (150). The drive rod (115) diameter and thread must be of a size such that the rod engages the threads in the internally-threaded passageway (405) in the drive hub (135). The length of the drive rod (115) may be any convenient length, for example up to about the full length of the high-pressure vessel, and preferably in lengths from 1 foot to 6 feet.

In a preferred embodiment, the drive rod (115) preferably has a narrowed diameter segment (118) at one end to engage the bearing plate (110). At the other end, the drive rod (115) has a smaller diameter segment (117) to enable attachment of an optional extension rod (125) with a mating female end (129).

In this embodiment, the drive rod (115) preferably is milled at the smaller diameter segment (117) with a square hole (119) suitable for insertion of a socket drive. This enables use of a socket drive to rotate the drive rod (115) and advance the plunger (105) in the high-pressure vessel (150). Thus, the square hole permits use of commonly available hand, air or electrically-powered tools to rotate the drive rod (115). Other configurations involving square or hex head end segments may be used in alternative embodiments.

A groove (116) is preferably cut in the drive rod (115) smaller diameter segment (117) that permits a locking set screw to be inserted in an extension set screw hole (127) to secure the extension rod (125) to the drive rod (115) smaller diameter segment (117).

The extension rod (125) is threaded so that when joined with the drive rod (115), it forms a continuous thread. Preferably, the extension rod (125) has a female end (129) to mate with the drive rod smaller diameter segment (117).

The extension rod (125) permits use of a short drive rod to minimize the space in front of the high-pressure vessel (150) needed to use the tool. One or more such extension rods effectively extends the length of the drive rod (115) to suit any length high-pressure vessel (150).

Preferably, this same type of square hole (124), smaller diameter end (128), and groove (126) is at an end of the extension rod (125) to permit connection to another similarly configured extension.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

What is claimed is:

1. A system, said system comprising a combination having a high-pressure vessel for removal of a reverse osmosis membrane, the high-pressure vessel comprising: a right circular cylindrical pipe; a circumference; an inside diameter; and a longitudinal axis, said system further comprising a tool having:

a plunger of circular cross-section having a diameter less than that of the inside diameter of the high-pressure vessel and configured to be pushed along the longitudinal axis of the high-pressure vessel;

a clamp to secure the tool to the outside of the high-pressure vessel;

a drive hub secured to the clamp such that an internally-threaded passageway in the drive hub is parallel with the longitudinal axis of the high-pressure vessel; and a drive rod threaded to advance within the drive hub through the threaded passageway and push the plunger along the longitudinal axis of the high-pressure vessel.

2. The system of of claim 1 wherein the tool further comprises a bearing plate affixed to the plunger to distribute load from the advance of the drive rod.

3. The system of claim 1 wherein the drive rod comprises a length and the tool further comprises an extension rod to extend length of the drive rod, wherein the extension rod:

is threaded so that when joined with the drive rod it forms a continuous thread;

has a female end to mate with the drive rod;

has a smaller diameter at the opposite end to enable attachment of an additional extension rod; and is milled at such opposite end with a square hole suitable for insertion of a socket drive.

4. The system of claim 1 wherein the clamp comprises a plurality of arcuate spring-like attachments and a plurality of nuts and bolts, wherein each arcuate spring like attachments has a bolt hole at each end to permit the plurality of arcuate spring-like attachments to be joined together and tightened around the circumference of the high-pressure vessel by the plurality of nuts and bolts and further each arcuate spring-like attachment has a connection fixture for a clamp arm leading to the drive hub.

5. The system of claim 2 wherein the drive rod:

has a narrowed diameter segment at one end to engage the bearing plate;

has a smaller diameter segment at the opposite end to enable attachment of an extension rod having a female end; and is end milled with a square hole suitable for insertion of a socket drive.

6. A tool for removal of a reverse osmosis membrane from a high-pressure vessel, the high-pressure vessel comprising: a right circular cylindrical pipe; a circumference; an inside diameter; and a longitudinal axis, the tool comprising:

a plunger of circular cross-section having a diameter less than that of the inside diameter of the high-pressure vessel;

a clamp to secure the tool to the outside of the high-pressure vessel;

a drive hub secured to the clamp such that an internally-threaded passageway in the hub is parallel with the longitudinal axis of the high-pressure vessel;

a drive rod comprising a length, the drive rod threaded to advance within the drive hub through the threaded passageway and push the plunger along the longitudinal axis of the high-pressure vessel; and an extension rod to extend the length of the drive rod, wherein the extension rod:

is threaded so that when joined with the drive rod it forms a continuous thread;

has a female end to mate with the drive rod;

has a smaller diameter at the opposite end to enable attachment of an additional extension rod; and is milled at such opposite end with a square hole suitable for insertion of a socket drive.

7. The tool of claim 6 further comprising a bearing plate affixed to the plunger to distribute load from the advance of the drive rod.

8. The tool of claim 7 wherein the drive rod:

has a narrowed diameter segment at one end to engage the bearing plate;

has a smaller diameter segment at the opposite end to enable attachment of an extension rod having a female end; and is end milled with a square hole suitable for insertion of a socket drive.

9. The tool of claim 6 wherein the clamp comprises a plurality of arcuate spring-like attachments and a plurality of nuts and bolts, wherein each arcuate spring like attachments has a bolt hole at each end to permit the plurality of arcuate spring-like attachments to be joined together and tightened around the circumference of the high-pressure vessel by the plurality of nuts and bolts and further each arcuate spring-like attachment has a connection fixture for a clamp arm leading to the drive hub.

* * * * *